Jan. 19, 1960  J. T. ROBSON  2,921,356
APPARATUS FOR REGULATING THE OPERATION OF A TUNNEL KILN
Filed July 13, 1955  2 Sheets-Sheet 2
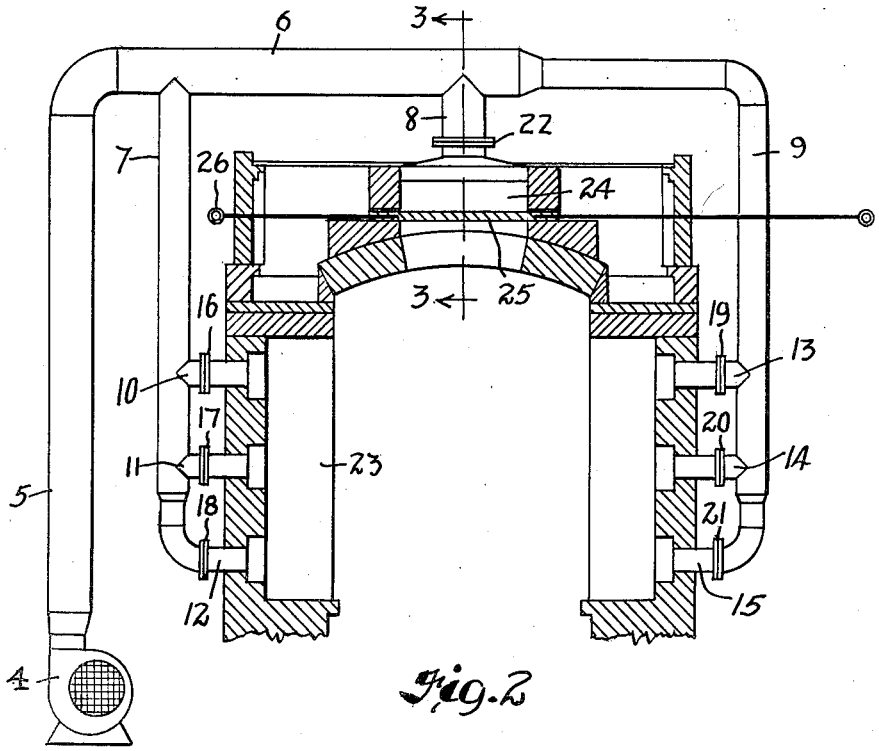
*Fig. 2*
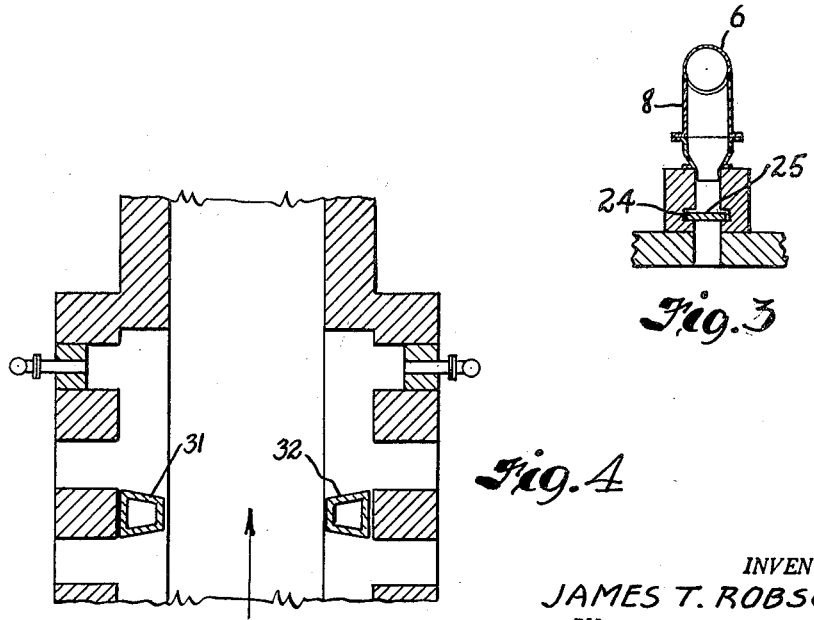
*Fig. 3*
*Fig. 4*
INVENTOR.
JAMES T. ROBSON
BY
Oberlin & Limbach
ATTORNEYS.

United States Patent Office 2,921,356
Patented Jan. 19, 1960

2,921,356

APPARATUS FOR REGULATING THE OPERATION OF A TUNNEL KILN

James T. Robson, Cleveland Heights, Ohio, assignor to Ferro Corporation, Cleveland, Ohio, a corporation of Ohio Application July 13, 1955, Serial No. 521,661

3 Claims. (Cl. 25—142)

The present invention relates, as indicated, to apparatus for controlling the operation of a tunnel kiln and more particularly to a means for rapidly cooling fired ceramic ware.

In the use of continuous tunnel kilns ware being heated usually passes through a preheating section, a firing section, and a cooling section. In respect to the preheating and firing sections my improved tunnel kiln need not differ significantly from known continuous tunnel kilns heretofore used in firing ceramic wares. My improved kiln differs, however, from all prior kilns known to me, in respect to its provisions for cooling the ware after it has been subjected to the firing temperature.

It has been a long felt want in the ceramic industry to be able to rapidly cool fired ware from a bright red heat down to a dull red heat. A procedure of this kind would greatly reduce the time necessary to produce finished ware from a continuous kiln and thus increase the capacity of the kiln.

However, heretofore this has not been done successfully due to the fact that cooling was done by radiation or conduction with the result that only the outside of the "settings" were cooled giving uneven cooling resulting in loss of ware due to cracking, etc. There also have been attempts made to cool by convection but because of the velocity of the cooling air the ware was shattered on the outside of the setting.

It is therefore the principal object of this invention to provide a means whereby ceramic ware in a continuous tunnel kiln can be rapidly cooled from a bright red heat to its so-called quartz-inversion temperature. In other words down to approximately 1050° F. to 1200° F. where the reversible expansion of beta contraction in cooling beta to alpha quartz occurs.

Other objects will appear as the description proceeds.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

My invention is characterized by the apparatus provisions which I employ to rapidly cool the ceramic ware as it emerges from the firing section of the kiln.

Referring to the accompanying drawings:

Fig. 2 is a cross-sectional view taken through line 2—2 of Fig. 1;

Fig. 3 is a cross-sectional view taken through line 3—3 of Fig. 2; and

Fig. 4 is a plan view of a section of a kiln embodying an alternate apparatus of the present invention.

Figure 1:
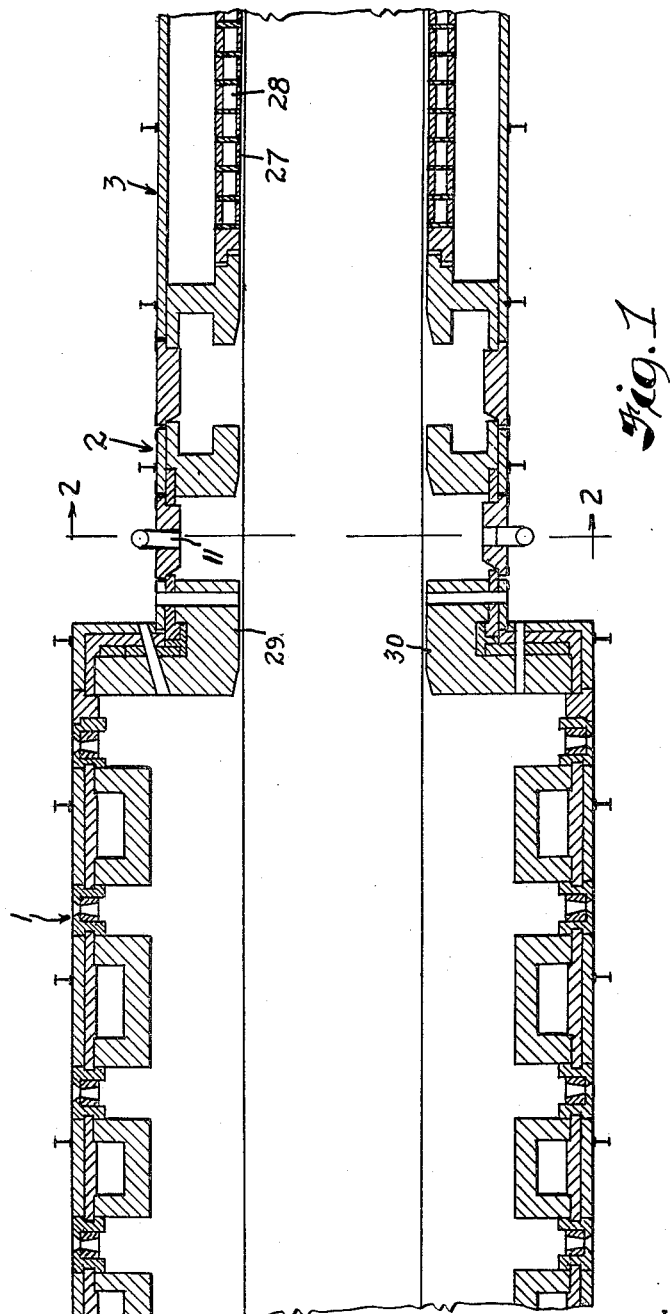
Fig. 1 is a plan view of a portion of a kiln embodying the present invention.

Referring now more specifically to the drawings and more especially to Fig. 1, the apparatus illustrated here is a portion of a kiln showing the firing zone indicated at 1, the rapid cooling zone 2 (embodying the features of the present invention) and the slow cooling zone generally indicated at 3.

I have found that in order to rapidly cool ceramic ware from a bright-red heat to its quartz-inversion temperature two important factors must be considered. First, the ware must be cooled evenly. That is, substantially all surfaces must be uniformly subjected to the cooling medium. Second, and of the utmost importance the cooling gases must be brought into contact with the ware in substantially large volume yet with a minimum of velocity. It is this latter factor which all of the prior art kilns have failed to achieve.

It should be noted here that after the ware has reached its quartz inversion temperature it is necessary to slowly cool from this point on and for this reason slow cooling zone 3 is provided.

As the fired ware leaves firing zone 1 it immediately enters rapid cooling zone 2. From Fig. 1 it will readily be appreciated that rapid cooling zone 2 is relatively small in comparison to firing zone 1 and slow cooling zone 3. While rapid cooling zone 2 may vary in size, depending on the overall size of the kiln, the type and amount of ware produced and various other factors, nevertheless it will always be found to be substantially smaller than the firing zone or the slow cooling zone.

Air for rapid cooling zone 2 is supplied by fan 4 through duct 5. As previously stated it is necessary to supply rapid cooling zone 2 with a large volume of air with a very low velocity. To accomplish this I prefer to use a fan having about 1" to 3" static pressure at its outlet side. The air is carried through duct 5 into duct 6. From duct 6 part of the air goes into duct 7 for cooling one side of zone 2, part of the air goes into duct 8 for entrance into the top of zone 2 and part of the air goes into duct 9 for supplying air to the other side of zone 2.

From ducts 7 and 9 the air enters zone 2 through ducts 10, 11, 12, 13, 14 and 15. The amount of air entering each of these latter ducts can be individually controlled by blast gates, or air valves, 16, 17, 18, 19, 20, and 21. Thus air entering the side walls of zone 2 will be evenly distributed from the bottom to the top of the side walls. The amount of air entering through duct 8 can be regulated by blast gate 22. Thus it will be seen that I have provided means for uniformly cooling all surfaces of the heated ware. The air entering through side wall ducts 10, 11, 12, 13, 14 and 15 and top duct 8 is allowed to expand immediately upon entering the kiln, as in areas 23 and 24, before it strikes the ware. This insures uniform temperature of air all over the kiln car setting and likewise allows the air not only to expand but to sufficiently rise in temperature as not to cool the ware below the quartz-inversion temperature, with the result the ware on the outside of the setting is not shattered. Since the air is put in at a low velocity it expands before striking the ware and thus a large volume can be put in under pressure resulting in the center of the setting being cooled simultaneously with the outside of the setting.

Top opening 24 is provided with a refractory damper 25 which can be closed as by rod 26 where the fire in zone 1 goes off or the kiln is shut down. Thus the heat is prevented from reaching the sheet metal duct work above.

The ware which has been cooled from a bright-red heat to a temperature of about 1050° F. to about 1200° F. leaves zone 2 and enters zone 3 where it is slowly cooled as in normal kiln cooling. Here the ware is cooled by rediation or conduction. Side wall 27 is a relatively thin wall behind which cooling air moves in space 28, the ware being in close proximity to wall 27 is cooled by radiation.

As illustrated in Fig. 1 rapid cooling zone 2 is placed adjacent to firing zone 1. However, it is entirely within the contemplation of this invention to construct a rapid cooling zone actually within the exit end of the firing zone itself. Or in the case of existing kilns where the firing zone is long enough the kiln can be converted to have a rapid cooling zone. Referring to Fig. 4 herein is illustrated a means for installing a rapid cooling zone in the exit end of a firing zone. Piers 31 and 32 can be installed in zone 1 which act to shut off zone 1 from zone 2 the same as the projecting walls 29 and 30 illustrated in Fig. 1. Thus by installing piers 31 and 32 and adjacent thereto installing the air supply means as illustrated in Fig. 2 an existing kiln can be made to produce more finished ware by the presence of a rapid cooling zone.

In carrying out the method of my invention ware is set onto a kiln car and introduced into a continuous tunnel kiln. Here as typical with substantially all tunnel kilns the ware is subjected to a "water smoking" which drives off water of hydration. The ware is then preheated and oxidized to eliminate carbonaceous material and to slowly raise the temperature of the ware. The ware then passes into the firing zone where it reaches the peak temperature. From this point my improved kiln differs from all prior kilns, in respect to the rapid cooling of the heated ware. On entering the rapid cooling zone the ware is directly subjected to a large volume of low velocity cooling air which reduces the temperature of the ware to about 1050° F. to 1200° F. In the preferred form of the invention the air is supplied by a fan having a 1" to 3" static pressure on its outlet side. The air enters the rapid cooling zone equally distributed through the side walls and top of the kiln. Since the air is put in at a low velocity it expands before striking the ware and thus a large volume is put in under pressure which completely surrounds all the ware resulting in the center of the setting being cooled the same as the outside of the setting. The ware now passes into the slow cooling chamber and undergoes slow cooling as in normal kiln usage.

Other modes of applying the principle of the invention may be employed change being made as regards the details described provided the features stated in any of the following claims or the equivalent of such be employed.

I, therefore, particularly point out and distinctly claim as my invention:

1. In a continuous tunnel kiln for ceramic ware and the like, including a rapid cooling zone, said rapid cooling zone comprising means for supplying cooling air at low velocity to said rapid cooling zone and including a plurality of relatively closely spaced air inlets in each of the opposing side walls and in the roof portion of said rapid cooling zone, an air expansion chamber formed in each of said side walls, said chamber extending at least the height of the ware to be cooled, and a chamber in said roof portion communicating with the respective of said air inlets and opening into the kiln proper of said rapid cooling zone, each of said chambers being of sufficient size in relation to the size of the respective air inlets such that the contour of volumetric expansion of air from one of said inlets intersects within the chamber the next adjacent contour of volumetric expansion of air from the next inlet whereby the cooling air expands substantially completely within the chambers to a relatively low velocity before entering the kiln proper of said rapid cooling zone, to prevent undue breakage in the ceramic ware setting due to uneven cooling by the cooling air, said chambers extending along a major portion of the interior perimeter of said side walls and said roof portion.

2. In a continuous tunnel kiln for ceramic ware and the like comprising preheating zones, a heating zone and cooling zones, said cooling zones including a rapid cooling zone located adjacent the exit of said heating zone, fan means for supplying cooling air to said rapid cooling zone, a plurality of relatively closely, vertically spaced air inlets in each of the opposing side walls of said rapid cooling zone of said kiln, said air inlets being in communication with said fan means, means associated with each of said air inlets for controlling the quantity of flow of air therethrough from said fan means, an inwardly opening continuous expansion chamber formed in each of said side walls and in said roof portion, said chambers being of sufficient size in relation to the size of the respective of said air inlets such that the contour of volumetric expansion of air from each of said inlets intersects within the chamber the next adjacent contour of volumetric expansion of air from the next adjacent inlet whereby the cooling air expands substantially completely within the chambers to a relatively low velocity before entering the kiln proper of said rapid cooling zone, to prevent undue breakage in the ceramic ware setting due to uneven cooling by the cooling air, said chambers in said side walls extending at least the height of the ware to be cooled.

3. In a continuous tunnel kiln for ceramic ware in accordance with claim 2, including movable damper means for isolating said air inlet in said roof portion from the interior of the kiln proper of said rapid cooling zone.

References Cited in the file of this patent

UNITED STATES PATENTS

| | | |
|---|---|---|
| 1,505,768 | Dressler | Aug. 19, 1924 |
| 1,705,477 | Hanley | Mar. 19, 1929 |
| 1,804,657 | Talbot | July 22, 1929 |
| 2,530,506 | Buchwald | Nov. 21, 1950 |
| 2,567,556 | Dressler et al. | Sept. 11, 1951 |
| 2,779,082 | Scharf | Jan. 29, 1957 |

FOREIGN PATENTS

| | | |
|---|---|---|
| 461,088 | Great Britain | Feb. 10, 1937 |